United States Patent
Reith et al.

(10) Patent No.: US 11,768,094 B2
(45) Date of Patent: Sep. 26, 2023

(54) METHOD FOR DETERMINING A VOLUMETRIC AND/OR MASS FLOW RATE

(71) Applicant: TrueDyne Sensors AG, Reinach (CH)

(72) Inventors: Patrick Reith, Basel (CH); Christof Huber, Bern (CH)

(73) Assignee: TrueDyne Sensors AG, Reinach (CH)

(*) Notice: Subject to any disclaimer, the term of this patent is extended or adjusted under 35 U.S.C. 154(b) by 158 days.

(21) Appl. No.: 16/955,165

(22) PCT Filed: Nov. 15, 2018

(86) PCT No.: PCT/EP2018/081426
§ 371 (c)(1),
(2) Date: Jun. 18, 2020

(87) PCT Pub. No.: WO2019/120791
PCT Pub. Date: Jun. 27, 2019

(65) Prior Publication Data
US 2020/0393279 A1    Dec. 17, 2020

(30) Foreign Application Priority Data
Dec. 20, 2017 (DE) .................. 10 2017 130 781.8

(51) Int. Cl.
*G01F 1/36* (2006.01)
*G01F 1/50* (2006.01)
(Continued)

(52) U.S. Cl.
CPC ................ *G01F 1/00* (2013.01); *G01F 1/363* (2013.01); *G01F 1/50* (2013.01); *G01F 5/005* (2013.01); *G01N 9/002* (2013.01); *G01N 11/16* (2013.01)

(58) Field of Classification Search
CPC ............. G01F 1/363; G01F 1/50; G01F 5/005
(Continued)

(56) References Cited

U.S. PATENT DOCUMENTS 9,638,559 B1 * 5/2017 Zummo ................... G01F 1/88
2015/0308990 A1   10/2015 Andreucci et al.

FOREIGN PATENT DOCUMENTS

CN       102804354 A    11/2012
CN       107063555 A     8/2017
(Continued)

OTHER PUBLICATIONS

Kalotay, Paul, Density and viscosity monitoring systems using Coriolis flow meters, ISA Transactions 38 (1999), 8 pp. (303-310).
(Continued)

*Primary Examiner* — John Fitzgerald
*Assistant Examiner* — Rodney T Frank
(74) *Attorney, Agent, or Firm* — Christopher R. Powers; Endress+Hauser (USA) Holding, Inc.

(57) ABSTRACT

The present disclosure relates to a method for determining a volumetric and/or mass flow rate of a medium flowing in a tube, wherein a density and/or a viscosity of the fluid is/are determined using a MEMS sensor chip, wherein the medium flowing in the tube at least partially flows through a measuring channel of the MEMS sensor chip to determine the density and/or the viscosity of the fluid, and wherein the volumetric and/or mass flow rate of the medium is determined regardless of the medium based on a detected pressure drop over the measuring channel of the MEMS sensor chip and the density and/or viscosity determined by the MEMS sensor.

8 Claims, 2 Drawing Sheets

(51) Int. Cl.
  *G01F 5/00* (2006.01)
  *G01N 9/00* (2006.01)
  *G01N 11/16* (2006.01)
  *G01F 1/00* (2022.01)
  *G01F 1/88* (2006.01)

(58) Field of Classification Search
  USPC ..................................................... 73/861.52
  See application file for complete search history.

(56) References Cited

FOREIGN PATENT DOCUMENTS

| | | |
|---|---|---|
| DE | 102014119212 A1 | 6/2016 |
| DE | 102015110711 A1 | 1/2017 |
| DE | 102015115499 A1 | 3/2017 |
| DE | 102015117468 A1 | 4/2017 |
| DE | 102015118346 A1 | 4/2017 |
| EP | 0874976 A1 | 11/1998 |
| WO | 2016205353 A1 | 12/2016 |

OTHER PUBLICATIONS

Smith, Richard et al., A MEMS-based Coriolos Mass Flow Sensor for Industrial Applications, IEEE Transactions on Industrial Electronics, Apr. 2009, vol. 56, No. 4.
Zeng, Yaxiang et al., Air Damping Analysis of a Micro-Coriolis Mass Flow Sensor, Sensors, 2022, vol. 22, No. 673.

\* cited by examiner

METHOD FOR DETERMINING A VOLUMETRIC AND/OR MASS FLOW RATE

CROSS-REFERENCE TO RELATED APPLICATIONS

The present application is related to and claims the priority benefit of German Patent Application No. 10 2017 130 781.8, filed on Dec. 20, 2017 and International Patent Application No. PCT/EP2018/081426, filed on Nov. 15, 2018 the entire contents of which are incorporated herein by reference.

TECHNICAL FIELD

The invention relates to a method for determining a volumetric and/or mass flow rate of a medium flowing in a tube, and to a device for determining a volumetric and/or mass flow rate of a medium flowing in a tube.

BACKGROUND

Devices for determining a volumetric flow rate according to the differential pressure principle are known per se. Here, orifice plates, for example, are used as effective pressure setting devices and a pressure difference across the orifice plate is detected. A differential pressure measuring device and knowledge of the material's characteristic values, especially viscosity, density and isentropic exponent, are required for the measurement itself. Details for this are defined in the standard ISO 5167-1 from the year 2004 and 2:2003 from the year 2003.

A disadvantage of this is that the measurement of the volumetric flow rate is dependent on the material values of the medium (media-dependent), which must therefore be known.

It is therefore an object of the present invention to remedy this.

SUMMARY

The object is achieved according to the invention by the method according to claim 1 and the device according to claim 5.

In order to determine a volumetric and/or mass flow rate of a medium flowing in a tube, the method according to the invention provides that a density and/or a viscosity of the fluid is/are determined by means of a MEMS sensor chip, wherein the medium flowing in the tube at least partially flows through a measuring channel of the MEMS sensor chip to determine the density and/or the viscosity of the fluid, and wherein the volumetric and/or mass flow rate of the medium is determined regardless of the medium by means of a detected pressure drop |p2−p1| over the measuring channel of the MEMS sensor chip and the density and/or viscosity determined by the MEMS sensor.

MEMS sensor chips are micro-electromechanical systems which are used in metrology for metrologically detecting one or more measurement values. These MEMS sensor chips are regularly produced using methods customary in semiconductor technology, such as etching processes, oxidation methods, implantation methods, bonding methods and/or coating methods, using single- or multi-layer wafers, especially silicon-based wafers.

MEMS sensor chips which are used to determine a measurement value of a flowing medium, especially a liquid or a gas, usually have at least one measuring channel, the interior of which forms a line through which the medium flows during measuring.

According to the invention, it is now proposed that, in parallel with the conventional volumetric flow rate measurement according to the differential pressure principle, a MEMS sensor chip is determined the current density and/or viscosity of the medium so that a medium-independent volumetric and/or mass flow rate measurement is made possible.

A further development of the invention provides that the measuring channel of the MEMS sensor chip is connected to the tube in such a way that the medium flows completely through the measuring channel of the MEMS sensor chip, so that the pressure drop |p2−p1| is substantially generated by the measuring channel of the MEMS sensor chip.

An alternative further development of the invention provides that an orifice plate is introduced into the tube in such a way that the medium flows through the orifice plate and the measuring channel of the MEMS sensor chip in parallel and the pressure drop |p2−p1| is generated by the orifice plate introduced into the tube and the measuring channel of the MEMS sensor chip through which medium partially flows. The further development can especially provide that the orifice plate and the measuring channel are matched to one another in such a way that a flow ratio of the medium flowing through the measuring channel to the medium flowing through the orifice plate is set to be less than 1:20, preferably 1:100, especially preferably less than 1:500.

The device according to the invention for determining a volumetric and/or mass flow rate of a medium flowing in a tube comprises at least:

A MEMS sensor chip having a measuring channel which is connected to the tube to determine a density and/or a viscosity of the medium in such a way that the medium flows at least partially through the measuring channel, A differential pressure measuring arrangement for detecting a pressure drop |p2−p1| over the measuring channel of the MEMS sensor chip, and An evaluation unit which is set up to determine the volumetric and/or mass flow rate of the medium regardless of the medium on the basis of the pressure drop |p2−p1| determined by the differential pressure measuring arrangement and the density and/or viscosity determined by the MEMS sensor chip.

A further development of the invention provides that the MEMS sensor chip is connected to the tube in such a way that the medium flows completely through the measuring channel of the MEMS sensor chip, so that substantially the measuring channel of the MEMS sensor chip generates the pressure drop |p2−p1| and the differential pressure measuring arrangement is further designed to detect the pressure drop over the measuring channel of the MEMS sensor chip.

An alternative further development of the invention provides for this purpose that the device further has an orifice plate through which the medium flows, wherein the orifice plate and the measuring channel of the MEMS sensor chip are introduced into the tube in such a way that the medium flows through both the orifice plate and the measuring channel, preferably in parallel.

A further development of the invention provides that the measuring channel of the M EMS sensor chip has a flow cross-section $A_{measuring\ channel}$ with a diameter in the range of 0.03-1 mm, preferably 0.05-0.6 mm, especially preferably 0.1-0.3 mm.

Another further development of the invention provides that the orifice plate has an orifice plate opening with a flow cross-section $A_{aperture\ plate}$, wherein the flow cross-section $A_{aperture\ plate}$ of the orifice plate opening is designed in such a way that a flow ratio of the medium flowing through the flow cross-section $A_{measuring\ channel}$ of the measuring channel to the medium flowing through the flow cross-section $A_{aperture\ plate}$ of the orifice plate opening $A_{aperture\ plate}$ is set to be less than 1:20, preferably less than 1:100, especially preferably less than 1:500.

BRIEF DESCRIPTION OF THE DRAWINGS

The invention is explained in more detail with reference to the following drawings. The figures show.

DETAILED DESCRIPTION

Figure 1:
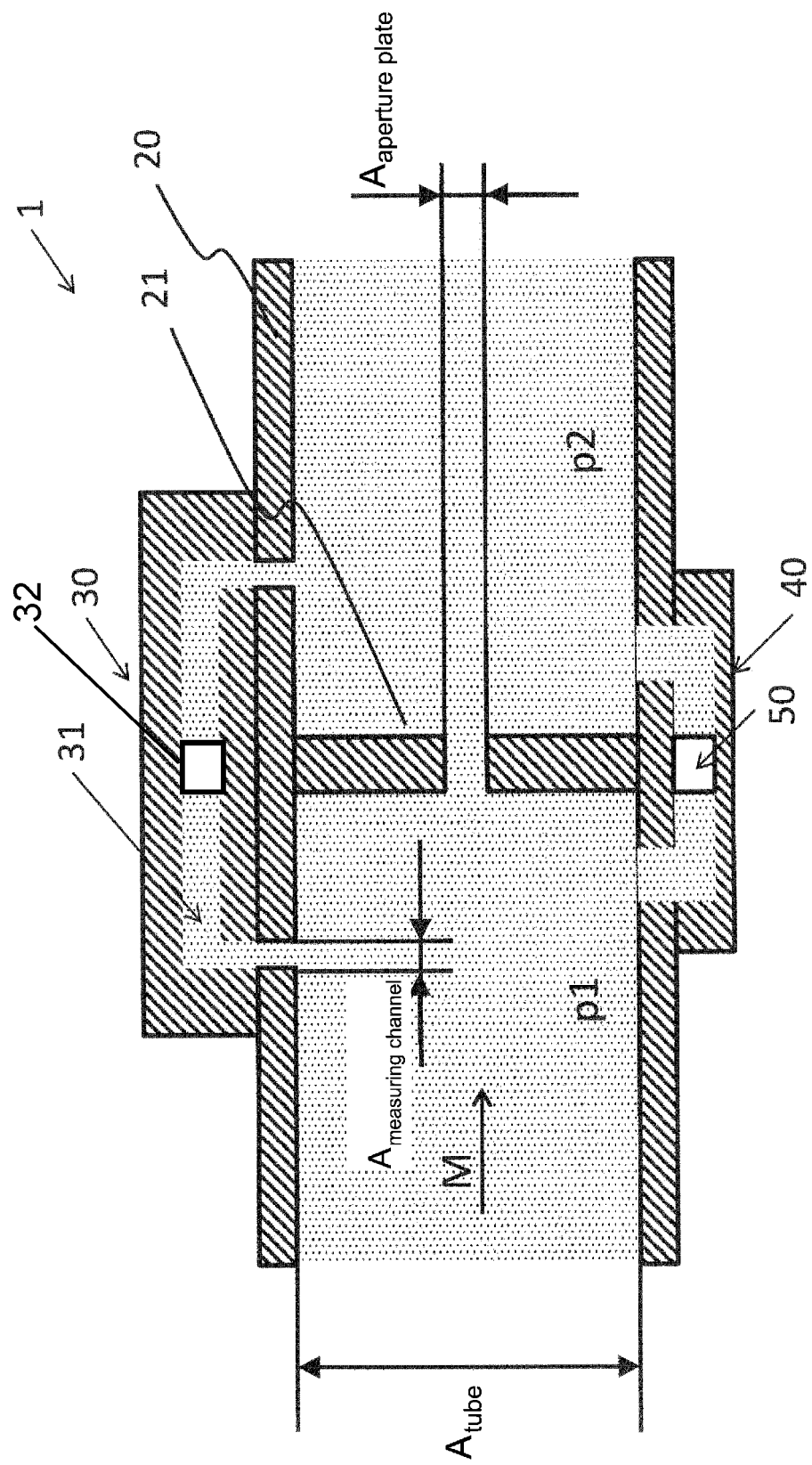
FIG. 1 shows a first exemplary embodiment of the present disclosure.

FIG. 1 shows a first exemplary embodiment of the invention. In this case, the device for determining a volumetric and/or mass flow rate 1 comprises a differential pressure measuring arrangement 40 for determining a volumetric flow rate which is constructed according to the effective pressure setting device principle and has an orifice plate 21 in a tube 20 through which a medium M is to flow. The tube 20 typically has a flow cross-section $A_{tube}$ with a diameter in the range of <30 mm, preferably <10 mm, especially preferably <5 mm. The orifice plate 21 is introduced into the tube 20 in the flow direction as an effective pressure setting device. The orifice plate 21 has an orifice plate opening with an opening or flow cross-section $A_{aperture\ plate}$ with a diameter of typically 0.2-10 mm, preferably 0.4-5 mm, especially preferably 0.7-2 mm. In addition to the flow path of the medium M through the orifice plate 21, in a flow path parallel thereto, a MEMS sensor chip 30 for determining the density and/or viscosity of the medium M is connected to the tube 20. The MEMS sensor chip 30 has a measuring channel 31 through which the medium M flows during measuring so that the density and/or viscosity of the medium M can be determined by the M EMS sensor chip 30. The measuring channel 31 typically has a flow cross-section $A_{measuring\ channel}$ with a diameter in the range of 0.03-1 mm, preferably 0.05-0.6 mm, especially preferably 0.1-0.3 mm.

In principle, MEMS sensor chip 30 operates with an oscillatable unit 32 whose oscillation behavior is detected in order to determine the density and/or the viscosity. In this case, the viscosity, for example, of the medium M can be determined using a Q factor of the oscillation of the oscillatable unit 32. Depending on the medium M, the oscillatable unit 32 of the MEMS sensor chip 30 can be designed differently. In the case where the medium M comprises a gas, the oscillatable unit 32 can be designed, for example, in the form of a cantilever or a crystal oscillator, whereas in the case where the medium M comprises a liquid, the oscillatable unit 32 can be designed, for example, in the form of a measuring channel 31 excited to oscillation. In both cases, the fact that at least one property of the oscillation of the oscillatable unit 32 changes due to a density and/or viscosity of the medium M so that the density and/or viscosity can be determined is utilized.

The device for determining a volumetric and/or mass flow rate 1 further comprises an evaluation unit 50 which is set up to determine the volumetric and/or mass flow rate of the medium regardless of the medium on the basis of the pressure drop |p2−p1| determined by the differential pressure measuring arrangement 40 and the density and/or viscosity determined by the MEMS sensor chip 30. For this purpose, the evaluation unit 50 can determine the volumetric flow rate through the tube on the basis of the determined pressure drop |p2−p1| and the viscosity according to the Hagen-Poiseuille law. Furthermore, the evaluation unit 50 can also determine the mass flow rate through the tube 20 on the basis of the determined density.

Figure 2:
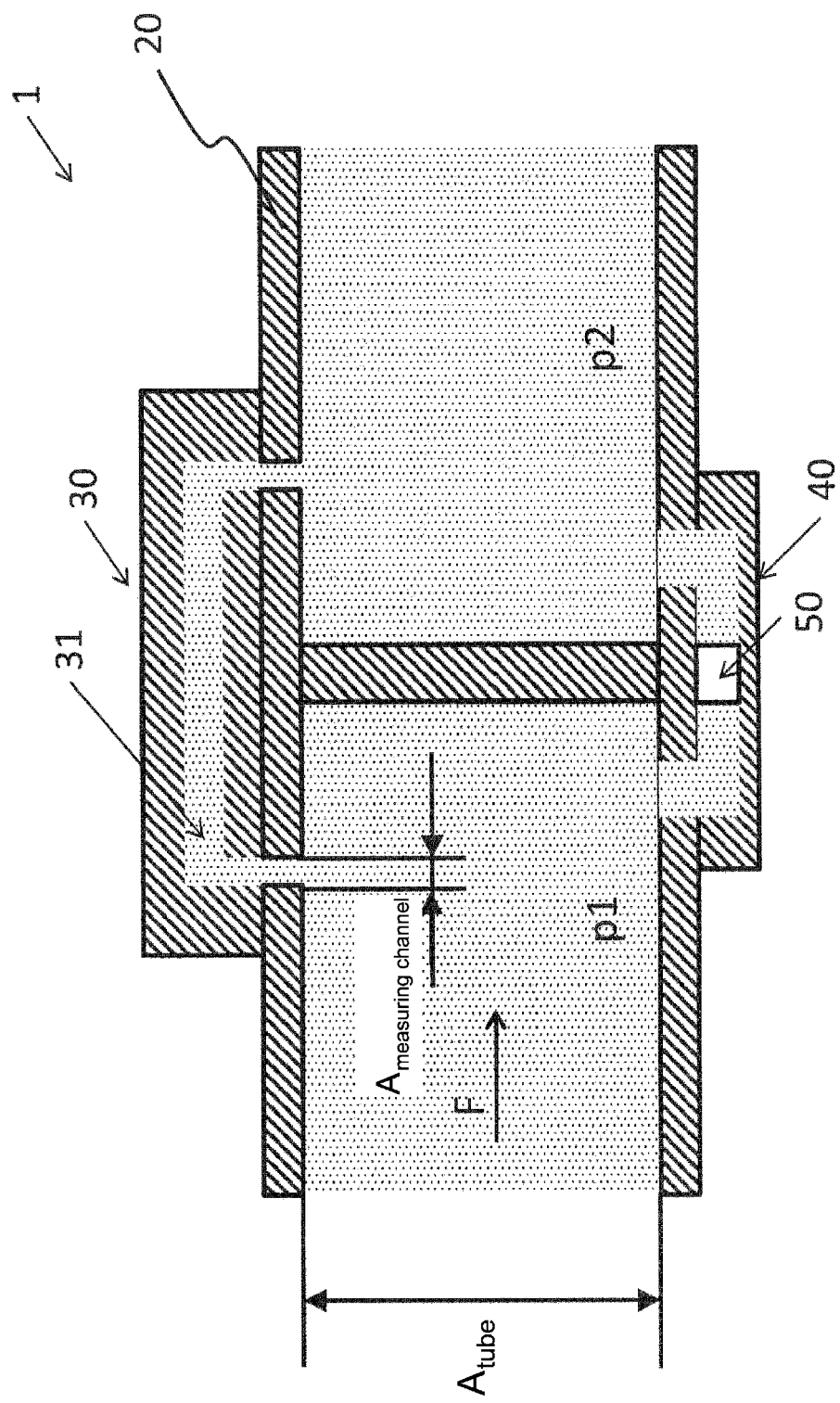
FIG. 2 shows a second exemplary embodiment of the present disclosure alternative to the first embodiment.

FIG. 2 shows a second exemplary embodiment of the invention that is an alternative to the first exemplary embodiment. The device for determining a volumetric and/or mass flow rate 1 differs from the first exemplary embodiment in that, although a differential pressure measuring arrangement 40 is also provided here, it has no orifice plate in this case, but is designed in such a way that the medium M flows completely through the measuring channel 31 of the MEMS sensor chip 30. This means that the differential pressure measuring arrangement 40 is thus designed in such a way that only a first pressure p1 before the measuring channel of the MEMS sensor chip and a second pressure p2 after the measuring channel of the MEMS sensor chip are detected to determine the pressure drop |p2−p1|.

The invention claimed is:

1. A method for determining a volumetric and/or mass flow rate of a medium flowing in a tube, the method comprising:
    determining a density and/or a viscosity of the medium using a microelectromechanical systems (MEMS) sensor chip, wherein the MEMS sensor chip includes a measuring channel in fluid communication with the tube and configured such that the medium flowing in the tube at least partially flows through the measuring channel, wherein the MEMS sensor chip includes an oscillatable unit exposed to the medium, wherein an oscillation behavior of the oscillatable unit is detected, from which the density and/or viscosity is calculated; and
    determining a medium-independent volumetric and/or mass flow rate of the medium as a function of a detected pressure drop over the measuring channel of the MEMS sensor chip and of the density and/or viscosity determined from the MEMS sensor chip,
    wherein the tube includes an orifice plate configured such that the medium flows through the orifice plate and the measuring channel in parallel such that the pressure drop is generated by the orifice plate and the measuring channel through which the medium partially flows, and
    wherein the orifice plate and the measuring channel are sized relative to each other such that a flow ratio of the medium flowing through the measuring channel to the medium flowing through the orifice plate is less than 1:20.

2. The method of claim 1, wherein the orifice plate and the measuring channel are sized relative to each other such that a flow ratio of the medium flowing through the measuring channel to the medium flowing through the orifice plate is less than 1:500.

3. The method of claim 1, wherein the oscillatable unit is the measuring channel.

4. A device for determining a volumetric and/or mass flow rate of a medium flowing in a tube, the device comprising:
    a microelectromechanical systems (MEMS) sensor chip including a measuring channel therethrough which is in fluid communication with the tube such that medium flows at least partially through the measuring channel, wherein the MEMS sensor chip is configured to determine a density and/or a viscosity of the medium via an oscillatable unit of the MEMS sensor chip exposed to the medium, wherein an oscillation behavior of the oscillatable unit is detected, from which the density and/or viscosity is calculated;

an orifice plate through which the medium at least partially flows, wherein the orifice plate and the measuring channel of the MEMS sensor chip are connected to the tube such that the medium flows through both the orifice plate and the measuring channel in parallel, and wherein the orifice plate includes an opening with a flow cross-section, wherein the flow cross-section of the opening is configured such that a flow ratio of the medium flowing through a flow cross-section of the measuring channel to the medium flowing through the flow cross-section of the opening is less than 1:20;

a differential pressure measuring arrangement configured to detect a pressure drop over the measuring channel of the MEMS sensor chip, wherein the pressure drop is generated by the orifice plate and the measuring channel through which the medium partially flows; and an evaluation unit configured to determine the volumetric and/or mass flow rate of the medium independent of the medium as a function of the pressure drop detected by the differential pressure measuring arrangement and the density and/or viscosity determined by the MEMS sensor chip.

5. The device of claim 4, wherein the measuring channel of the MEMS sensor chip has a flow cross-section with a diameter in the range of 0.03-1 mm.

6. The device of claim 4, wherein the measuring channel of the MEMS sensor chip has a flow cross-section with a diameter in the range of 0.1-0.3 mm.

7. The device of claim 4, wherein the orifice plate includes an opening with a flow cross-section, wherein the flow cross-section of the opening is configured such that a flow ratio of the medium flowing through a flow cross-section of the measuring channel to the medium flowing through the flow cross-section of the opening is less than 1:500.

8. The device of claim 4, wherein the oscillatable unit is the measuring channel.

* * * * *